United States Patent
Larkin et al.

(10) Patent No.: US 7,430,301 B2
(45) Date of Patent: Sep. 30, 2008

(54) METHOD FOR THE ENHANCEMENT OF COMPLEX PEAKS

(75) Inventors: Kieran Gerard Larkin, Putney (AU); Peter Alleine Fletcher, Rozelle (AU)

(73) Assignee: Canon Kabushiki Kaisha, Tokyo (JP)

( * ) Notice: Subject to any disclaimer, the term of this patent is extended or adjusted under 35 U.S.C. 154(b) by 814 days.

(21) Appl. No.: 10/499,141

(22) PCT Filed: Dec. 18, 2002

(86) PCT No.: PCT/AU02/01714

§ 371 (c)(1),
(2), (4) Date: Sep. 27, 2004

(87) PCT Pub. No.: WO03/052676

PCT Pub. Date: Jun. 26, 2003

(65) Prior Publication Data
US 2005/0111691 A1    May 26, 2005

(30) Foreign Application Priority Data

Dec. 19, 2001 (AU) .................................. PR 9634

(51) Int. Cl.
*G06K 9/00* (2006.01)
*H04K 3/00* (2006.01)
*H04N 7/167* (2006.01)

(52) U.S. Cl. .............................. 382/100; 380/1; 380/200

(58) Field of Classification Search ................. 382/100, 382/220, 254, 263, 266, 278, 280, 273; 370/210; 348/208.13, 627; 359/29, 306, 559, 560, 359/561; 380/1, 200, 243, 255

See application file for complete search history.

(56) References Cited

U.S. PATENT DOCUMENTS

| | | | | |
|---|---|---|---|---|
| 4,149,178 A | * | 4/1979 | Estes | 348/182 |
| 5,028,670 A | | 7/1991 | Chinh et al. | 526/73 |
| 5,261,010 A | * | 11/1993 | Lo et al. | 382/216 |
| 5,398,113 A | | 3/1995 | de Groot | 356/360 |
| 5,844,615 A | * | 12/1998 | Nuber et al. | 375/240.01 |
| 5,999,561 A | * | 12/1999 | Naden et al. | 375/142 |
| 7,154,975 B1 | * | 12/2006 | Bohnke et al. | 375/368 |

FOREIGN PATENT DOCUMENTS

| | | |
|---|---|---|
| EP | 0 584 701 | 8/1993 |
| GB | 2 272 594 | 5/1994 |

* cited by examiner

*Primary Examiner*—Abolfazl Tabatabai
(74) *Attorney, Agent, or Firm*—Fitzpatrick, Cella, Harper & Scinto (57) ABSTRACT

A method (200) of enhanced peak detection in a correlation signal (g(x)) is disclosed. The method (200) comprises identifying (215) in the correlation signal (g(x)) positions where the modulus value of the correlation signal is above a first predetermined value. Each of the identified positions is then processed by forming (220) a sub-signal from the correlation signal by isolating a region of samples, the region comprising substantially equal numbers of samples on opposite sides of the identified position. The sub-signal is then up-sampled (221, 222, 225) to a higher resolution using Fourier interpolation. The up-sampled sub-signal is searched (230) for a peak value, and when the peak value is greater than a second predetermined value, parameters associated with the peak value is stored (236).

24 Claims, 8 Drawing Sheets

Fig. 6 real part          imaginary part

Fig. 7A          Fig. 7B

METHOD FOR THE ENHANCEMENT OF COMPLEX PEAKS

TECHNICAL FIELD OF THE INVENTION

The present invention relates generally to detecting peaks in sampled correlation signals and, in particular, to detecting an underlying peak position when the peak itself is not necessarily visible in the sampled correlation signal.

BACKGROUND ART

The need to detect peaks in signals occurs as part of many schemes and methods of data analysis. One such area is object detection using correlation. The output of a correlation detector is a signal in which the positions of peaks indicate the positions where the object was present.

For example, watermarking often relies on the imperceptible embedding of a known pattern in a signal, with the signal being a single-dimensional signal, or multi-dimensional signal such as an image, video or 3D space. The detection of the presence of the known embedded pattern is then facilitated by a matched filtering operation, which is commonly called correlation. The result of correlation of suitable patterns is a sharp peak at the position of best overlap between the known pattern and the signal with the embedded pattern. However, it is often desirable to make the intensity of the embedded pattern as small as reasonably possible, thereby allowing the embedded pattern to be imperceptible by a human. For example, it is desirable for the embedded pattern to be imperceptible to the human eye in the case of an image watermarking, or human ear in the case of audio watermarking.

Due to the low intensity of the embedded pattern, the correlation peak may be only marginally above the background noise level in the correlation signal. Additionally, it often occurs that the correlation peak does not correspond with a signal sample position. The result is that the correlation peak appears attenuated, compared to its ideal, or potential peak value. This is potentially problematic as a peak may be missed in a peak detection process because the peak may not have a value higher than a predetermined value. Another potential problem is that, even when the peak is appropriately detected, the location of the peak may be incorrectly ascribed, as the true location of the peak is somewhere between sample positions.

SUMMARY OF THE INVENTION

It is an object of the present invention to substantially overcome, or at least ameliorate, one or more disadvantages of existing arrangements.

According to a first aspect of the invention, there is provided a method of enhanced peak detection in a correlation signal, said method comprising the steps of:

(a) identifying in said correlation signal at least one position with a modulus value above a first predetermined value; and (b) for each said identified position performing the steps of:

(ba) forming a sub-signal by isolating a region of samples of said correlation signal, said region comprising substantially equal numbers of samples on opposite sides of said position;

(bb) up-sampling said sub-signal to a higher resolution using Fourier interpolation;

(bc) searching said up-sampled sub-signal for a peak value; and (bd) storing parameters associated with said peak value when said peak value is greater than a second predetermined value.

According to another aspect of the invention, there is provided an apparatus for implementing the method.

Other aspects of the invention are also disclosed.

BRIEF DESCRIPTION OF THE DRAWINGS

One or more embodiments of the present invention will now be described with reference to the drawings, in which.

DETAILED DESCRIPTION INCLUDING BEST MODE

Some portions of the description which follows are explicitly or implicitly presented in terms of algorithms and symbolic representations of operations on data within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as values, functions, patterns, numbers, arrays or the like.

The present specification also discloses apparatus for performing the operations of the methods. Such apparatus may be specially constructed for the required purposes, or may comprise a general-purpose computer or other device selectively activated or reconfigured by a computer program stored in the computer. Various general-purpose machines may be used with programs in accordance with the teachings herein. Alternatively, the construction of more specialized apparatus to perform the required method steps may be appropriate. The structure of a conventional general-purpose computer will appear from the description below.

In addition, the present specification also discloses a computer readable medium comprising a computer program for performing the operations of the methods. The computer readable medium is taken herein to include any transmission medium for communicating the computer program between a source and a designation. The transmission medium may include storage devices such as magnetic or optical disks, memory chips, or other storage devices suitable for interfacing with a general-purpose computer. The transmission medium may also include a hard-wired medium such as exemplified in the Internet system, or wireless medium such as exemplified in the GSM mobile telephone system.

Where reference is made in any one or more of the accompanying drawings to steps and/or features, which have the same reference numerals, those steps and/or features have for the purposes of this description the same function(s) or operation(s), unless the contrary intention appears.

Figure 1:
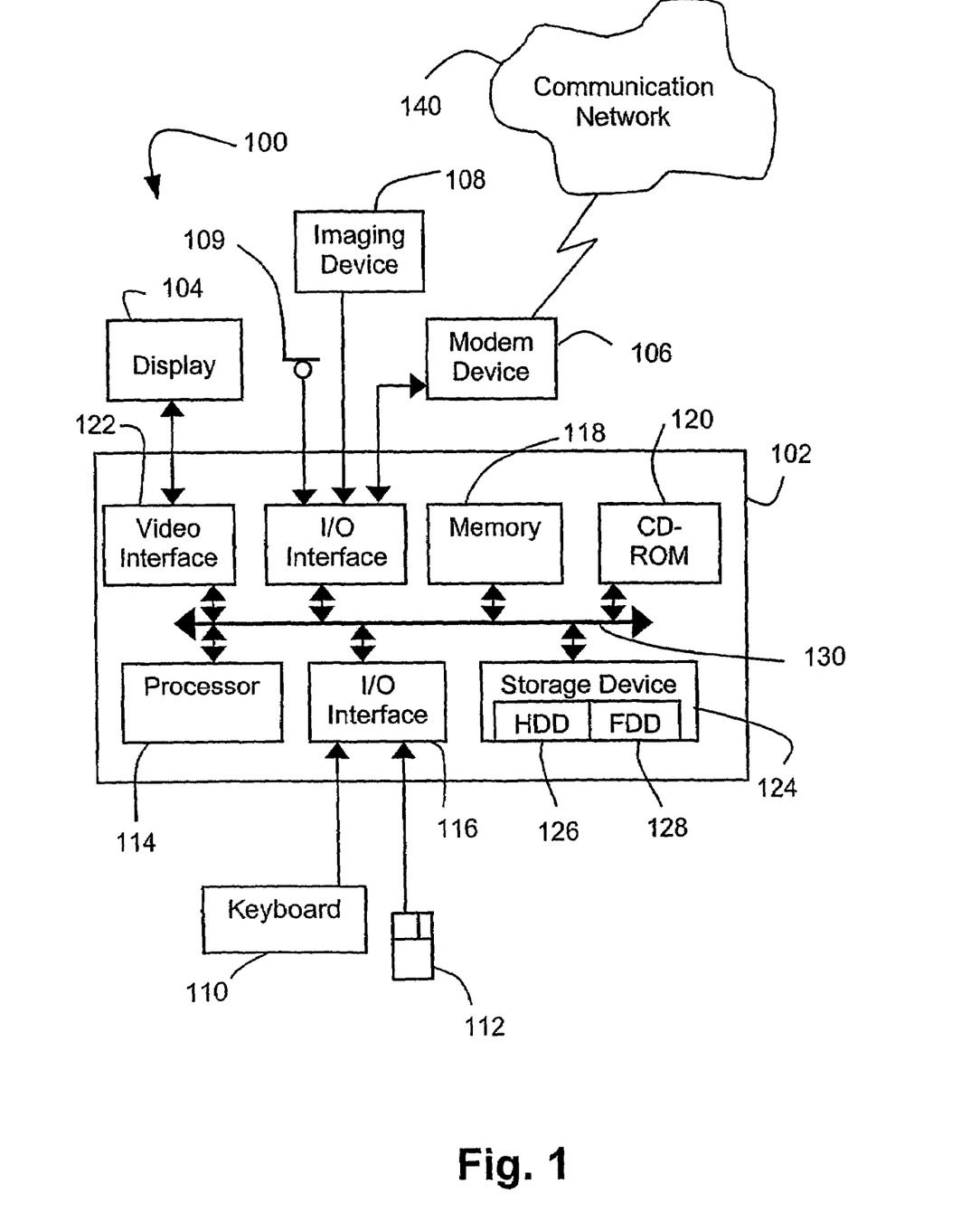
FIG. 1 is a schematic block diagram of a general-purpose computer upon which arrangements described can be practiced.

The apparatus for performing the operations of the disclosed methods is preferably a general-purpose computer system 100. The computer system 100 comprises a computer module 102, input devices such as a keyboard 110, a mouse 112, an imaging device 108 and a microphone 109, and output devices including a display device 104. The imaging device 108 may include for example a digital camera or a scanner. A Modulator-Demodulator (Modem) transceiver device 106 is used by the computer module 102 for communicating to and from a communications network 140, for example connectable via a telephone line or other functional medium. The modem 106 can be used to obtain access to network systems, such as the Internet, a Local Area Network (LAN) or a Wide Area Network (WAN).

The computer module 101 typically includes at least one processor unit 114, a memory unit 118, for example formed from semiconductor random access memory (RAM) and read only memory (ROM), input/output (I/O) interfaces including a video interface 122, and I/O interfaces 116 and 117. A storage device 124 is provided and typically includes a hard disk drive 126 and a floppy disk drive 128. A CD-ROM drive 120 is typically provided as a non-volatile source of data. The components 114 to 128 of the computer module 102, typically communicate via an interconnected bus 130 and in a manner which results in a conventional mode of operation of the computer system 100 known to those in the relevant art.

In one of the simplest embodiments of watermarking, a watermark pattern is added to an original signal. The signal may be a still image, a video sequence or an audio stream. It is preferable for such watermark patterns to be imperceptible to human observers of the signal. To aid imperceptibility, a perceptual mask may be used to amplify the embedded mark in regions of high signal variation (where large signals are easy to hide) and to attenuate the watermark pattern in regions of low variation in the original signal.

In the detection of the watermark pattern in the resulting signal, it is desirable to use a matching technique that gives a reliable signal when the watermark pattern is present and no signal when the watermark pattern is not present. An optimum matching technique is correlation, and in particular, cross-correlation of the resulting signal with the watermark pattern, which provides peaks in the correlation signal at locations corresponding with positions where the watermark pattern was embedded into the original signal. Furthermore, detecting patterns using correlation performs equally well in one or more dimensions.

For detection of watermark patterns which have been perceptually masked during the watermarking operation, it is desirable to approximately invert the masking. Once the inverse masking is performed, cross-correlation is performed on the resultant signal of the inverse masking and the watermark pattern.

When the watermark pattern is correlated with the summation of the original signal and the watermark pattern, it is equivalent to the sum of cross-correlation between the watermark pattern and the original signal, and autocorrelation of the watermark pattern. The main contribution to the correlation signal is made by the autocorrelation portion.

Most naturally occurring patterns have autocorrelation signals which are rather broad. In contrast, when the autocorrelation is calculated for a wideband signal, that being a signal that has a spectral magnitude which covers a substantial part of the frequency domain, a much sharper autocorrelation signal is achieved. The spectral magnitude of a signal may be evaluated by Fast Fourier transforming the sampled signal data and a signal has a sharp autocorrelation signal if a peak of the autocorrelation is spread over a small number of samples. The spread of the autocorrelation signal of a given signal is inversely proportional to the spectral bandwidth of that given signal. For example, the autocorrelation signal of a white-noise signal is close to a delta function.

In a watermarking system, whether applied to audio, images, video or three-dimensional volumes, it is advantageous to use patterns for embedding which may be termed "white noise-like", i.e. patterns that have a broad spectral bandwidth and a narrow autocorrelation signal. Pseudo random noise patterns are therefore often used as watermarks for embedding, as such patterns have sharp autocorrelation signals, as well as a large space of possible patterns. A measure of peak sharpness is the Full Width Half Maximum (FWHM) defined as the width of the main frequency lobe at the points where the signal's spectrum value has dropped by 50%. Accordingly, in the following, it is assumed that the patterns chosen for embedding are wideband.

Figure 6:
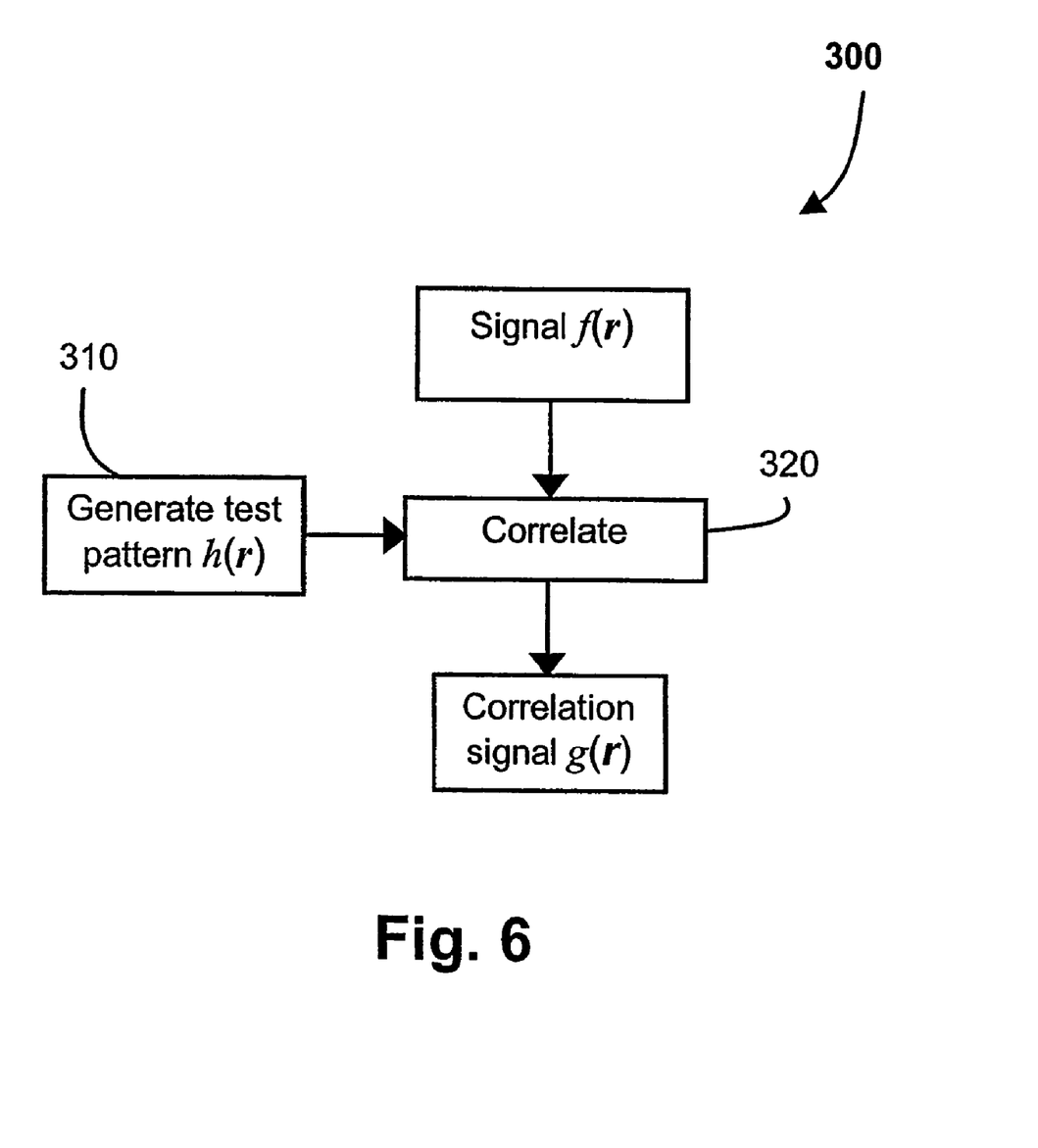
FIG. 6 shows a watermarking detection method which utilizes the peak detection arrangement of FIG. 4.

FIG. 6 shows a schematic diagram of a process 300 of detecting the presence of a test pattern h(r) in a signal f(r). The test pattern h(r) is mathematically generated by the processor 114 using a test pattern equation in step 310 and correlated with the signal f(r) in step 320 to form a correlation signal g(r). If the signal f(r) includes the test pattern h(r) such that:

$$f(r)=k(r)+h(r) \qquad (1)$$

where k(r) is the signal to which the test pattern h(r) was added for watermarking, the test pattern h(r) would have little or no correlation with signal k(r) and a significant correlation peak in the correlation signal g(r) at the position where the test pattern h(r) was added to signal k(r).

In pattern detection, the primary interest is the position of the underlying peak and whether or not the underlying peak height is above a certain threshold value. The presence of signal k(r) to which the test pattern h(r) is added for watermarking results in "noise" in the correlation signal g(r). Attenuated peaks are thus often hidden amongst such noise, or alternatively, the noise may be mistaken for a correlation peak. It is therefore desirable to test potential correlation peaks to determine whether they are merely attenuated true peaks, or merely noise.

The signals f(r) and h(r) are typically discrete signals, having a value for each n-dimensional sample space of r, and stored as n-dimensional arrays in the memory 118 of the computer system 100 (FIG. 1). The correlation of the discrete signal f(r) with the test pattern h(r) may be performed for the one-dimensional case as follows:

$$g(x) = f(x) \otimes h(x) = \frac{1}{M} \sum_{m=0}^{M-1} f(x-m) h^*(m) \qquad (2)$$

for x=0, 1, 2, ..., M−1 with M≧A+C−1, where A and C are the sizes of the sampled arrays of signals f(x) and h(x) respectively, and h*(x) is the complex conjugate of signal h(x). As is known in the art, both signals f(x) and h(x) are "zero padded" to length M before Equation (2) is evaluated, typically by the processor 114.

Similar expressions hold for other dimensions. For any dimension the correlation theorem also provides the Fourier pair of:

$$f(r) \otimes h(r) \Leftrightarrow F(w) H^*(w) \qquad (3)$$

where w is a frequency variable, also having dimension n, and F(w) and H(w) are the Discrete Fourier transforms of signals f(r) and h(r) respectively.

Figure 2A:
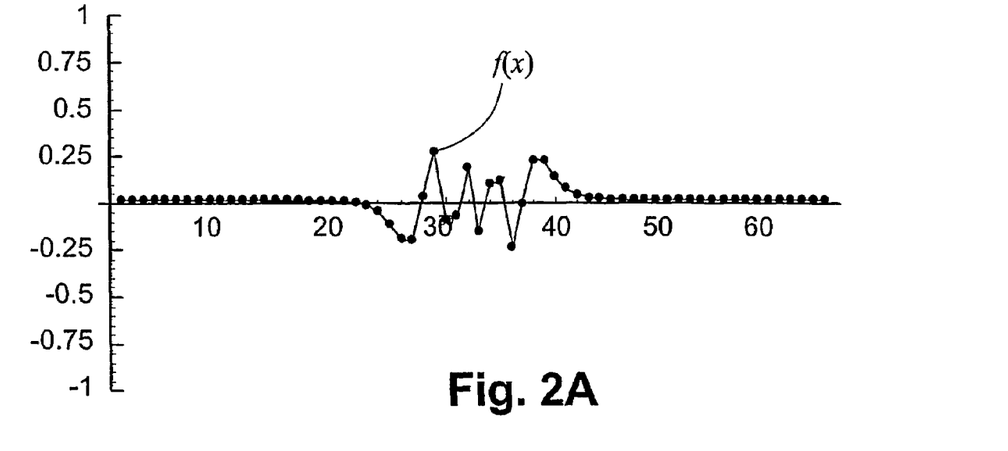
FIG. 2A shows an example signal in which a test pattern is embedded.
Figure 2B:
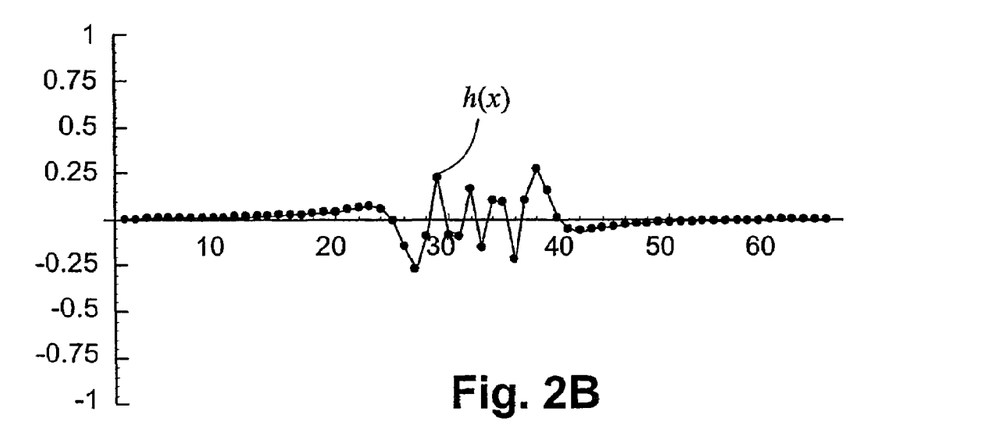
FIG. 2B shows the test pattern embedded in FIG. 2A.
Figure 2C:
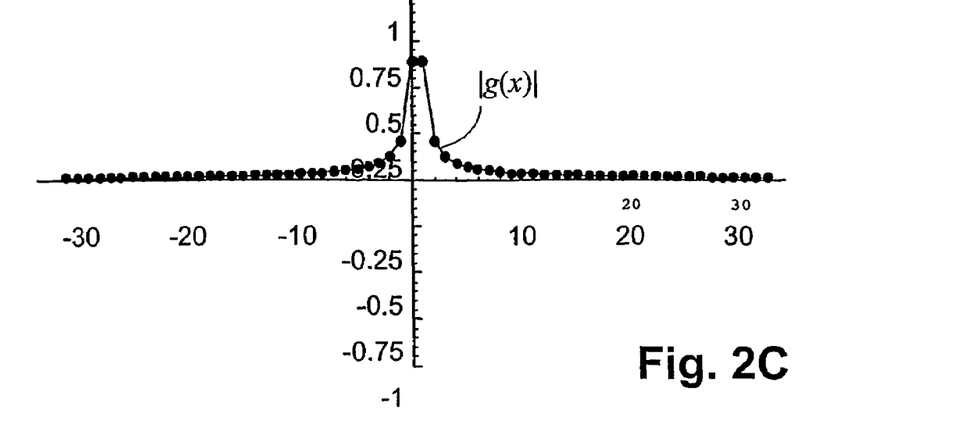
FIG. 2C shows the magnitude of the correlation signal resulting from correlating the example signal with the test pattern.

FIGS. 2A and 2B show examples of two one-dimensional real signals f(x) and h(x) respectively, each comprising 64 sample values. FIG. 2C shows the correlation function g(x) formed by correlating the example signals f(x) and h(x) shown in FIGS. 2A and 2B respectively. With both signals f(x) and h(x) being wideband, the correlation function g(x) has a peak spread over a limited number of sample intervals. The theoretical peak is not on a sample position thereby adding to the spread of the peak over a number of sample intervals and causing the attenuation of the peak value by about 35%. The detected peak is at the origin, which may be interpreted to mean that signal h(x) was not delayed before it was added to k(x) (not illustrated) to form signal f(x).

Figure 4:
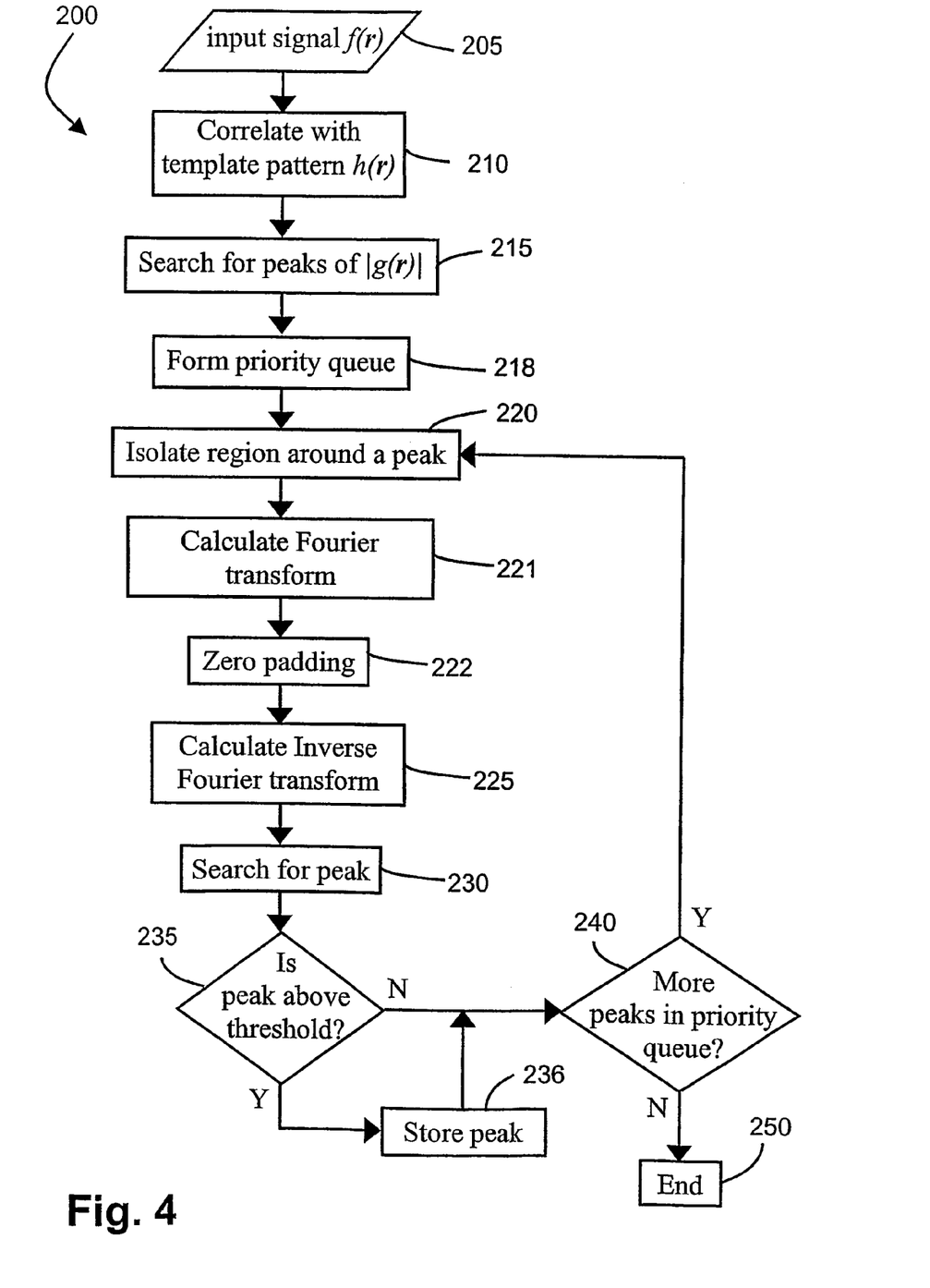
FIG. 4 shows a method of enhanced peak detection in a correlation signal.

FIG. 4 shows a method 200 of enhanced peak detection in a correlation signal g(r). The method 200 is preferably implemented as software, such as an application program executing within the computer system 100 shown in FIG. 1. The application program may be stored in a computer readable medium, including the storage devices described above, for example. The application program is loaded into the computer from the computer readable medium, and then executed by the processor 114 of the computer system 100. A computer readable medium having such software or computer program recorded on it is a computer program product. The use of the computer program product in the computer preferably effects an advantageous apparatus for enhanced peak detection in a correlation signal g(r).

Typically, the application program is resident on the hard disk drive 126 and read and controlled in its execution by the processor 114. Intermediate storage of the program and any data fetched from the network 140 may be accomplished using the semiconductor memory 118, possibly in concert with the hard disk drive 126. In some instances, the application program may be supplied to the user encoded on a CD-ROM or floppy disk and read via the corresponding drive 120 or 128, or alternatively may be read by the user from the network 120 via the modem device 106. Still further, the software can also be loaded into the computer system 100 from other computer readable media.

The method of enhanced peak detection in a correlation signal g(r) may alternatively be implemented in dedicated hardware such as one or more integrated circuits performing the functions of enhanced peak detection in a correlation signal g(r). Such dedicated hardware may include graphic processors, digital signal processors, or one or more microprocessors and associated memories.

The method 200 starts in step 205 where signal f(r) is received as input by the processor 114 and stored in memory 118. Signal f(r) is received for testing whether the test pattern h(r) is present in signal f(r). Signal f(r) may be received in digitally sampled form previously stored on the storage device 124. Alternatively, such a digital signal f(r) may be received from the communication network 140, may be formed by taking an image using imaging device 108 or formed by recording an audio signal using microphone 109.

In step 210 the processor 114 then correlates signal f(r) with a test pattern h(r) to form correlation signal g(r). In the preferred arrangement, the test pattern h(r) is mathematically formed by the processor 114 from a mathematical equation. The test pattern h(r) may alternatively be stored within the computer system 100.

Figure 5:
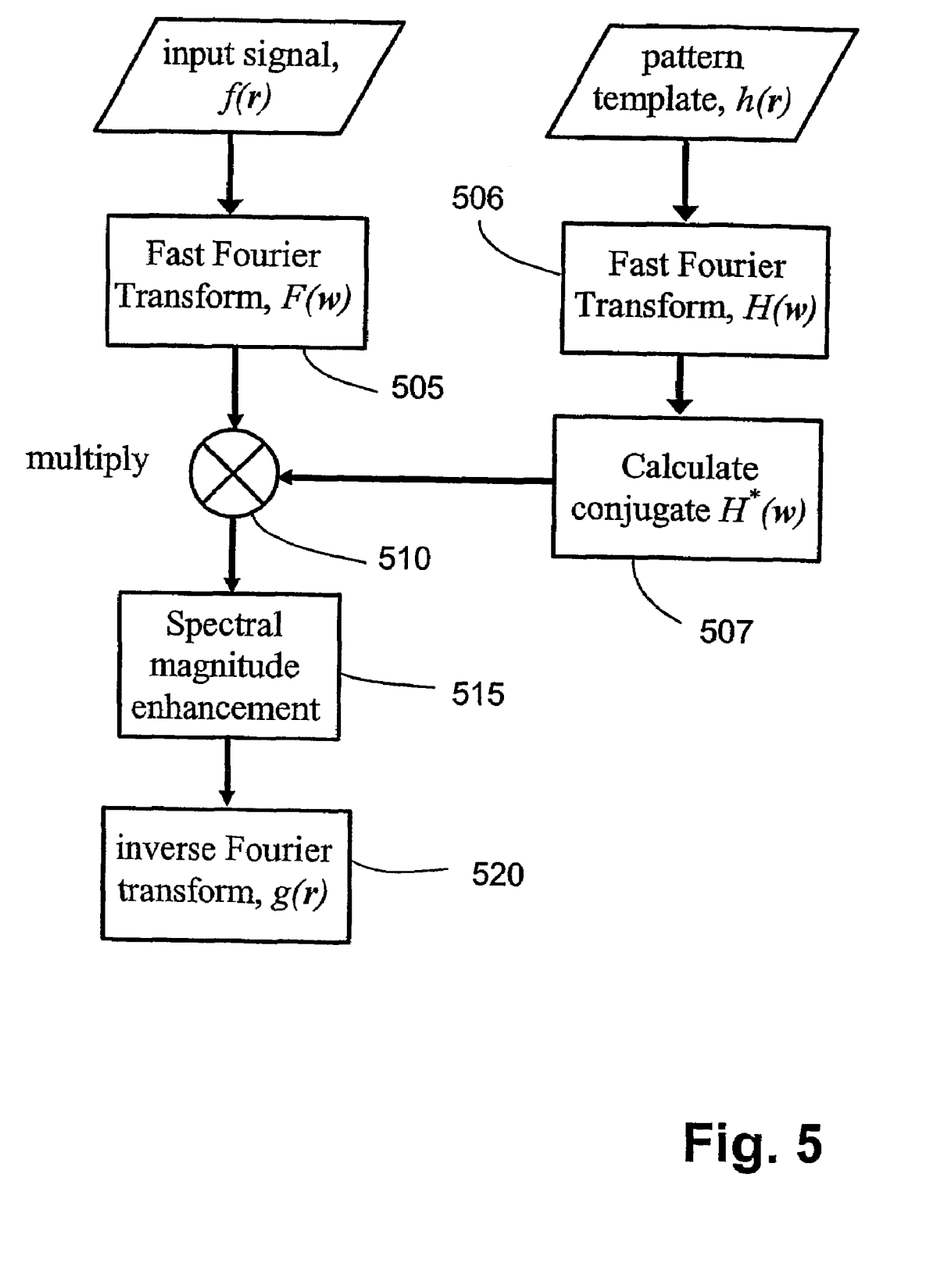
FIG. 5 illustrates a process of calculating the correlation of a signal with a test pattern to form a correlation signal.

FIG. 5 illustrates the process 500, performed by the processor 114, of calculating the correlation of signal f(r) with the test pattern h(r) to form correlation signal g(r). In step 505 the Fourier transform F(w) is calculated of signal f(r) and stored in memory 118. In a similar manner and in step 506, the Fourier transform H(w) is calculated of test pattern h(r). The complex conjugate H*(w) of the Fourier transform H(w) is also calculated in step 507.

The Fourier transform F(w) is multiplied by the processor 114 with the complex conjugate H*(W) for all values of frequency variable w in step 510 to form a Fourier transform G(w). In the preferred arrangement, a spectral magnitude enhancement step 515 follows to form an enhanced Fourier transform G'(w). The enhancement may include high boost spectral filtering in which high frequency components of Fourier transform G(w) are enhanced. In an alternative arrangement a Phase Only Correlation is used instead of steps 510 and 515. Finally, in step 520, the correlation signal g(r) is calculated by the processor 114 by performing an inverse Fourier transform on the enhanced Fourier transform G'(w). The correlation signal g(r) is also stored in memory 118.

Returning to method 200 shown in FIG. 4, with the correlation signal g(r) calculated, in step 215 the processor searches for peaks in the magnitude of correlation signal g(r). These peaks may include true peaks, some of which are attenuated, and false peaks as a result of noise. In step 218 a priority queue is formed and stored in memory, the priority queue containing the peaks detected in step 215, with the peaks in the priority queue ordered according to the magnitude values of correlation signal g(r) at the peak positions.

Figure 3A:
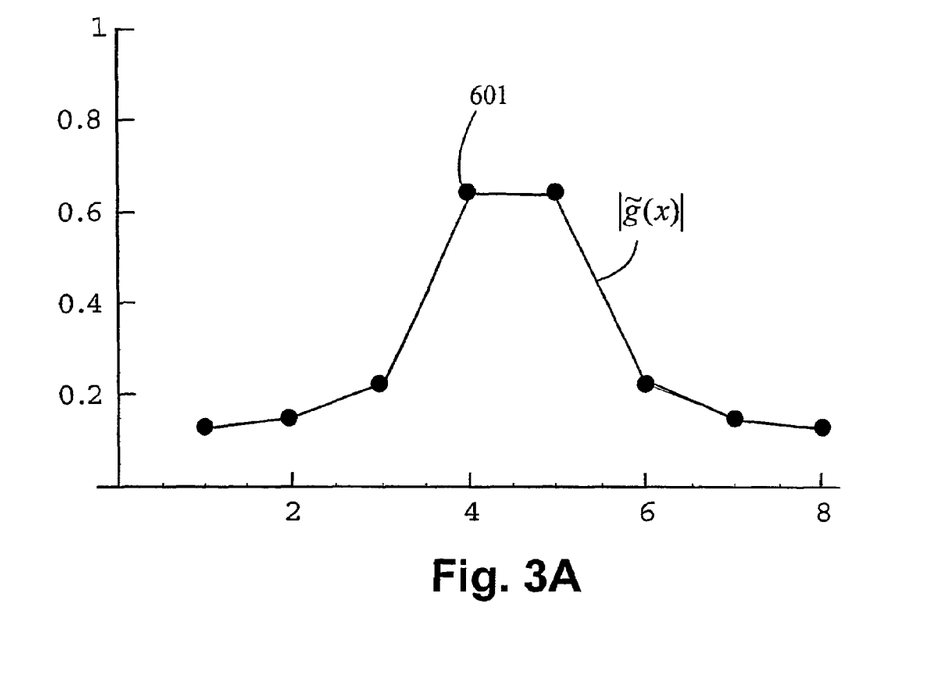
FIG. 3A shows the magnitude values formed from isolating 8 values around the peak of the correlation signal shown in FIG. 2C.

Starting with the first peak on the priority queue, a region including a predetermined number of sample values of correlation signal g(r) is isolated around that peak to form correlation signal g̃(r) in step 220 by the processor 114. FIG. 3A shows the magnitude values of such a correlation signal g̃(x) formed from isolating 8 values around the peak of the example correlation signal g(x) shown in FIG. 2C.

The correlation signal g̃(r) is next up-sampled by the processor 114 using Fourier interpolation and at a higher sample rate which allows the underlying structure of the correlation signal g̃(r) to become visible. The Fourier interpolation provides up-sampling with no loss or attenuation of higher frequency components of the correlation signal g̃(r). In one implementation, interpolation using the chirp-z transform is used, as is known in the art. In another implementation of the Fourier interpolation the sinc interpolation kernel is used.

In the implementation described with reference to FIG. 4, zero padding is used to up-sample the correlation signal g̃(r), starting in step 221 where the Fourier transform G̃(w) is calculated of the correlation signal g̃(r). The Fourier transform G̃(w) is then zero-padded in step 222 to form Fourier transform Ḡ(w) which includes N times the number of samples in each dimension as does Fourier transform G(w). The inverse Fourier transform is next performed in step 225 on Fourier transform $\overline{G}(w)$ to form an up-sampled correlation signal $\overline{g}(r)$. This concludes the up-sampling steps.

Figure 3B:
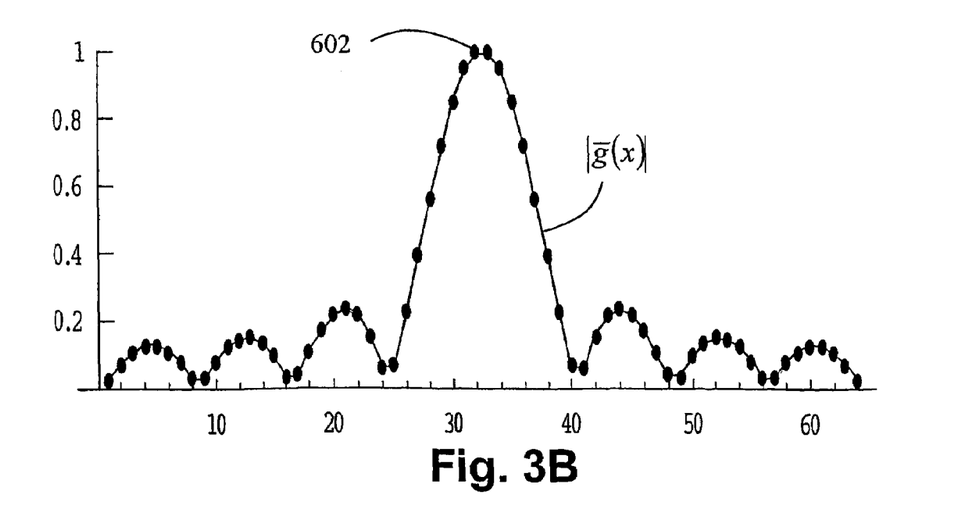
FIG. 3B shows the magnitude of an up-sampled correlation signal of the 8 values around the peak of the correlation signal shown in FIG. 3A.
Figure 3C:
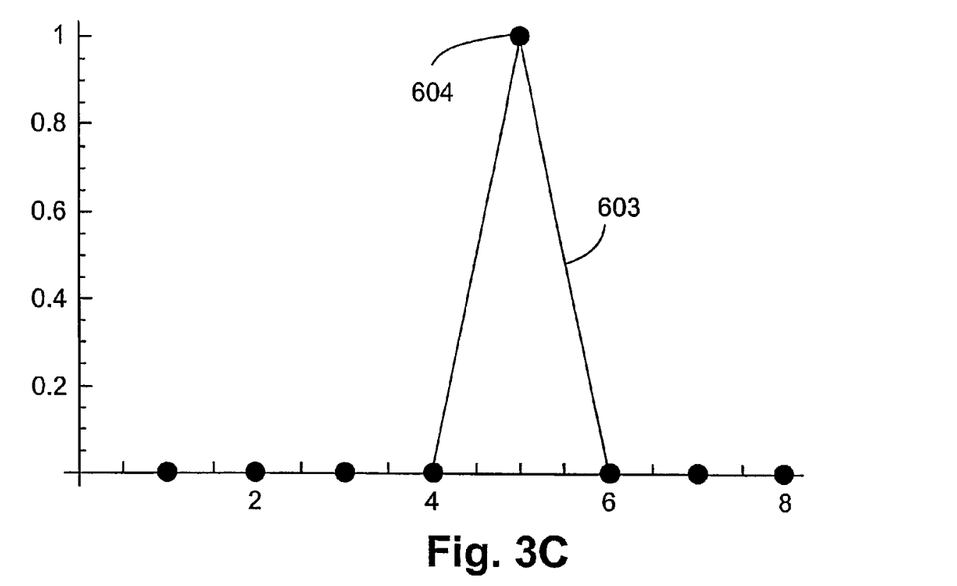
FIGS. 3C and 3D show an ideal correlation peak and its associated up-sampled correlation signal.

The up-sampled correlation signal $\overline{g}(r)$ of the example correlation signal $\tilde{g}(r)$ shown in FIG. 3A is shown in FIG. 3B, where the example correlation signal $\tilde{g}(r)$ has been up-sampled by a factor of 8. In the example correlation signal $\tilde{g}(r)$ the peak 601 is ½ a sample interval away from the true (theoretical) peak. In comparison, the peak 602 in FIG. 3B is now $\frac{1}{16}^{th}$ of the original sample spacing away from the true peak and the value of the peak 602 is about 99.3% of the theoretical value, allowing a peak value to be found. Accordingly, the up-sampling resulted in an enhancement of the detected peak allowing the underlying value and its position to be better estimated. In particular, in the example, the up-sampling represents a 56% enhancement of the detected peak. The enhanced position allows the position of an embedded pattern in a watermark to be determined within a fraction of the sampling interval. This is particularly useful when a message is encoded in the position of the embedded pattern, making the detection of a correct position necessary for decoding of the message.

Figure 3D:
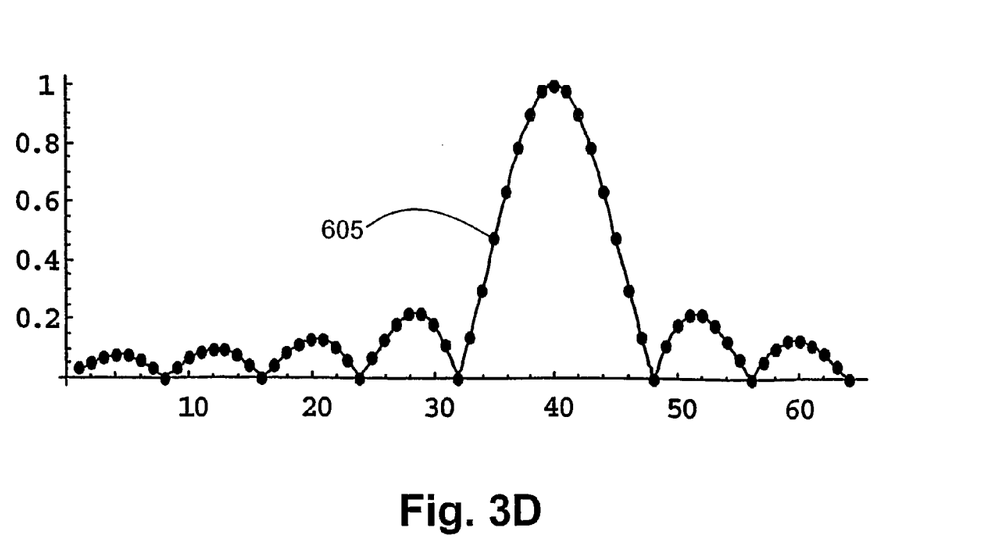

To further illustrate the enhancement of the peak, FIG. 3D shows a "best case" correlation signal 603, having a peak 604 falling exactly on the $5^{th}$ sample interval. When this correlation signal 603 is up-sampled in the manner described above, the up-sampled correlation signal 605 results. It can be seen that the underlying structure of the up-sampled correlation signal $\overline{g}(r)$ (FIG. 3B) corresponds with that of the up-sampled correlation signal 605 (FIG. 3D).

Step 230 follows the up-sampling steps, where the processor 114 searches for a peak in the up-sampled correlation signal $\overline{g}(r)$. In step 235 the processor 114 determined whether the peak found in step 230 is above a predetermined threshold. If the peak is above the predetermined threshold, parameters of the peak are stored in step 236 and in memory 118. The parameters may include the modulus value of peak value, the phase of peak value, and position of peak value. The position of the enhanced peak value may be used to better determine where a pattern h(r) was embedded in the signal f(r).

From either step 235 or 236 the method 200 proceeds to step 240 where the processor 114 determines whether there are any peaks left in the priority queue. If there are peaks left in the priority queue, then the method 200 proceeds to step 220 where the processor 114 isolates a region around a next peak in the priority queue to form the correlation signal $\tilde{g}(r)$. Steps 221 to 240 are repeated by the processor 114 with this correlation signal $\tilde{g}(r)$, until the processor 114 determines in step 240 that all the peaks in the priority queue have been processed. The method 200 then ends in step 250.

Even though method 200 has been illustrated through use of a one-dimensional example, the method 200 is equally applicable to any n-dimensional test pattern h(r) and signal f(r). The test pattern h(r) and signal f(r) may also be complex signals.

It is noted that up-sampling of the entire correlation signal g(r) is possible, from which the peaks of the up-sampled signal may then be found. However, such a method is not computationally efficient. For example, consider the correlation of an 1024×1024 image f(r) with a template pattern h(r). The process 500 (FIG. 5) may be used. First the image is zero padded (not illustrated in FIG. 5) to double its size in each dimension, namely 2048×2048. Then it is transformed in step 505 using the Fast Fourier Transform (FFT) to form another 2048×2048 signal F(w). The template pattern h(r) of size 2048×2048 is mathematically formed and then also transformed in step 506 using the FFT and complex conjugated in step 507 to form H*(w).

The two transforms F(w) and H*(w) are multiplied in step 510 and the product is inverse transformed in step 520 to form the correlation signal g(r). In this example spectral magnitude enhancement (step 515) is not performed.

It is often preferable for the watermark pattern to have certain invariant characteristics, such as scale invariance or rotation invariance, for example. Logarithmic radial harmonic functions (LRHF) have rotational and scale invariance properties, yet do not necessarily exhibit any obvious rotational symmetry. This makes patterns based on LRHF's the preferred pattern to use.

Figure 7A:
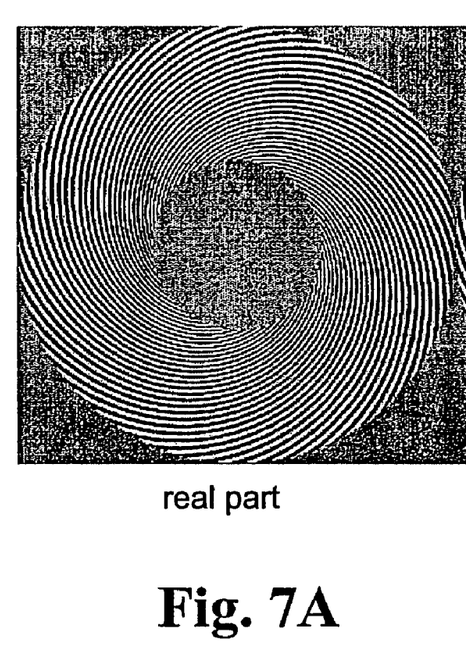
FIGS. 7A and 7B show the real and imaginary parts respectively of a typical two dimensional LRHF.
Figure 7B:
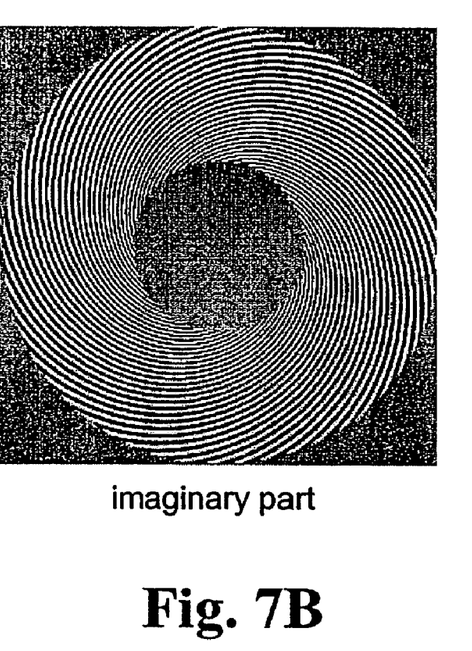

In two dimensions, the LRHF l of the preferred implementation is in the form:

$$l_{mk}(x,y) = w(x,y) \cdot |x^2+y^2|^{(i\alpha_m+p)/2} e^{ik\theta} \quad (4)$$

with k, p and $\alpha_m$ being parameters of the LRHF 1, and w(x,y) is a window function. The window function w(x,y) may be used to remove or de-emphasise a central region of the basis pattern g having frequencies above a predetermined frequency. FIGS. 7A and 7B show the real and imaginary parts respectively of a typical two dimensional LRHF $l_{mk}$ with parameters k=50 and $\alpha_m \cong 50$. As the LRHF $l_{mk}$ has negative values in its real and imaginary parts, the values the LRHF $l_{mk}$ have been normalised around a value of 127, with all values ranging from 0 to 255, 0 represented in black, 255 represented in white, and intermediate levels represented in levels of grey.

In most cases the input signal f(r) is a real signal, and any watermark pattern embedded therein can only have real values. Hence, a real part of a LRHF is used as the watermark pattern. However, the real part of a LRHF is not strictly speaking scale/rotation invariant, but rather periodically scale and rotation invariant.

However, the modulus of the cross-correlation of a real LRHF and a corresponding complex LRHF is substantially scale/rotation invariant. Hence, to overcome this difficulty, the (real) input signal f(r) is correlated with the full complex LRHF as pattern template h(r). This property of the LRHF makes the process 300 of detecting the presence of a test pattern h(r) in a signal f(r) substantially invariant to scale and rotation, even thought the embedded signal alone does not have strict invariance.

The proposed method 200 of enhanced peak detection in a correlation signal g(r) is particularly useful in watermarking systems using real watermark patterns and complex template patterns. The method 200 of enhanced peak detection typically allows significant increases in detection efficiency, especially when distortions such as scaling, rotation, and cropping have occurred.

The number of operations to determine the correlation signal g(r) is of the order $R^2 \log_2 R^2$, where $R=2048=2^{11}$. This is in the region of 100 million complex floating point operations. Now if the central 1024×1024 region of the correlation function g(r) is up-sampled by a factor of 8, $R=8\times1024=2^{13}$ and the number of operation is of the order 1.7 billion complex floating point operations, a factor of 17 times more intensive than correlation without up-sampling.

It is further noted that a peak searching algorithm applied to the up-sampling of the entire correlation signal g(r) requires many more operations than merely peak searching in the locally up-sampled regions, especially if it is required to order the peaks in terms of their values.

The above is compared with the method 200 which only requires up-sampling in the regions where potential peaks have been identified. The extra computation (above the 100 million baseline for correlation of signals h(r) and f(r)) is much smaller than the baseline. So for example, if 20 peaks are searched for, but 1000 potential peaks are identified, then a region of 8×8 around each of the potential peaks may be up-sampled by a factor of 8. The number of complex floating point operations is of the order of 1000×64 $\log_2$ 64=384,000. In other words, the extra computation takes 0.4% extra computation compared to 1700% extra computation for the full up-sampling approach.

The foregoing describes only some embodiments of the present invention, and modifications and/or changes can be made thereto without departing from the scope and spirit of the invention, the embodiments being illustrative and not restrictive.

In the context of this specification, the word "comprising" means "including principally but not necessarily solely" or "having" or "including" and not "consisting only of". Variations of the word comprising, such as "comprise" and "comprises" have corresponding meanings.

The invention claimed is:

1. A method of enhanced peak detection in a complex correlation signal, said method comprising the steps of:
   (a) identifying in said complex correlation signal at least one position with a modulus value above a first predetermined value; and
   (b) for each said identified position performing the steps of:
      (ba) forming a complex sub-signal by isolating a region of samples of said complex correlation signal, said region comprising substantially equal numbers of samples on opposite sides of said position;
      (bb) up-sampling said complex sub-signal to a higher resolution using Fourier interpolation;
      (bc) searching said up-sampled complex sub-signal for a peak value; and
      (bd) storing parameters associated with said peak value when said peak value is greater than a second predetermined value.

2. A method according to claim 1, wherein said parameters comprise at least one of:
   modulus value of peak value;
   phase of peak value; and
   position of peak value.

3. A method according to claim 1, wherein Fourier interpolation comprises the steps of:
   fourier transforming said complex sub-signal;
   zero padding said complex sub-signal; and
   inverse Fourier transforming said zero padded complex sub-signal.

4. A method according to claim 1, wherein said complex correlation signal is formed by correlating at least one wideband signal.

5. A method according to claim 1, wherein said higher resolution is at least two times the resolution of said complex correlation signal.

6. A method according to claim 1, further comprising:
   ordering the identified at least one position according to said up-sampled complex signals; and
   selecting at least one position from the identified at least one position based on said order.

7. An apparatus for enhanced peak detection in a complex correlation signal, said apparatus comprising:
   means for identifying in said complex correlation signal at least one position with a modulus value above a first predetermined value; and
   means for performing, on each identified position, the steps of:
      forming a complex sub-signal by isolating a region of samples of said complex correlation signal, said region comprising substantially equal numbers of samples on opposite sides of said position;
      up-sampling said complex sub-signal to a higher resolution using Fourier interpolation;
      searching said up-sampled complex sub-signal for a peak value; and
      storing parameters associated with said peak value when said peak value is greater than a second predetermined value.

8. An apparatus according to claim 7, wherein said parameters comprise at least one of:
   modulus value of peak value;
   phase of peak value; and
   position of peak value.

9. An apparatus according to claim 7, wherein Fourier interpolation comprises the steps of:
   fourier transforming said complex sub-signal;
   zero padding said complex sub-signal; and
   inverse Fourier transforming said zero padded complex sub-signal.

10. An apparatus according to claim 7, wherein said complex correlation signal is formed by correlating at least one wideband signal.

11. An apparatus according to claim 7, wherein said higher resolution is at least two times the resolution of said complex correlation signal.

12. A computer-readable medium on which is stored a computer program for enhanced peak detection in a complex correlation signal, said program comprising:
   code for identifying in said complex correlation signal at least one position with a modulus value above a first predetermined value; and
   code for, for each identified position, performing the steps of:
      forming a complex sub-signal by isolating a region of samples of said complex correlation signal, said region comprising substantially equal numbers of samples on opposite sides of said position;
      up-sampling said complex sub-signal to a higher resolution using Fourier interpolation;
      searching said up-sampled complex sub-signal for a peak value; and
      storing parameters associated with said peak value when said peak value is greater than a second predetermined value.

13. A computer-readable medium according to claim 12, wherein said parameters comprise at least one of:
   modulus value of peak value;
   phase of peak value; and
   position of peak value.

14. A computer-readable medium according to claim 12, wherein Fourier interpolation comprises the steps of:
   fourier transforming said complex sub-signal;
   zero padding said complex sub-signal; and
   inverse Fourier transforming said zero padded complex sub-signal.

15. A computer-readable medium according to claim 12 wherein said correlation signal is formed by correlating at least one wideband signal.

16. A method of detecting a watermark from a signal, said watermark having a basis pattern embedded, said method comprising the steps of:
- (a) maintaining a test pattern;
- (b) correlating said test pattern with said signal to form a complex correlation signal;
- (c) identifying in said complex correlation signal at least one position with a modulus value above a first predetermined value; and
- (d) for each said identified position performing the steps of:
  - (da) forming a complex sub-signal by isolating a region of samples of said complex correlation signal, said region comprising substantially equal numbers of samples on opposite sides of said position;
  - (db) up-sampling said complex sub-signal to a higher resolution using Fourier interpolation;
  - (dc) searching said up-sampled complex sub-signal for a peak value; and
  - (dd) storing parameters associated with said peak value when said peak value is greater than a second predetermined value.

17. A method according to claim 16, wherein said signal comprises one of:
- audio;
- image; and
- video.

18. A method according to claim 16, wherein Fourier interpolation comprises the steps of:
- fourier transforming said complex sub-signal;
- zero padding said complex sub-signal; and
- inverse Fourier transforming said zero padded complex sub-signal.

19. A method according to claim 16, wherein said test pattern and said basis pattern are wideband signals.

20. A method according to claim 16, wherein said higher resolution is at least two times the resolution of said complex correlation signal.

21. An apparatus for detecting a watermark from a signal, said watermark having a basis pattern embedded, said apparatus comprising:
- means for maintaining a test pattern;
- means for correlating said test pattern with said signal to form a complex correlation signal;
- means for identifying in said complex correlation signal at least one position with a modulus value above a first predetermined value; and
- means for performing, for each said identified position, the steps of:
  - forming a complex sub-signal by isolating a region of samples of said complex correlation signal, said region comprising substantially equal numbers of samples on opposite sides of said position;
  - up-sampling said complex sub-signal to a higher resolution using Fourier interpolation;
  - searching said up-sampled complex sub-signal for a peak value; and
  - storing parameters associated with said peak value when said peak value is greater than a second predetermined value.

22. An apparatus according to claim 21, wherein said signal comprises one of:
- audio;
- image; and
- video.

23. A computer-readable storage medium on which is stored a computer program for detecting a watermark from a signal, said watermark having a basis pattern embedded, said program comprising:
- code for maintaining a test pattern;
- code for correlating said test pattern with said signal to form a complex correlation signal;
- code for identifying in said complex correlation signal at least one position with a modulus value above a first predetermined value; and
- code for performing, for each said identified position, the steps of:
  - forming a complex sub-signal by isolating a region of samples of said complex correlation signal, said region comprising substantially equal numbers of samples on opposite sides of said position;
  - up-sampling said complex sub-signal to a higher resolution using Fourier interpolation;
  - searching said up-sampled complex sub-signal for a peak value; and
  - storing parameters associated with said peak value when said peak value is greater than a second predetermined value.

24. A computer-readable medium according to claim 23, wherein said signal comprises one of:
- audio;
- image; and
- video.

* * * * *